J. IVES.
Axle-Clips.

No. 147,268. Patented Feb. 10, 1874.

Witnesses.

Inventor:

UNITED STATES PATENT OFFICE.

JAMES IVES, OF MOUNT CARMEL, CONNECTICUT, ASSIGNOR TO IVES, WOODRUFF & CO., OF SAME PLACE.

IMPROVEMENT IN AXLE-CLIPS.

Specification forming part of Letters Patent No. 147,268, dated February 10, 1874; application filed December 13, 1873.

*To all whom it may concern:*

Be it known that I, JAMES IVES, of Mount Carmel, in the county of New Haven and State of Connecticut, have invented a new and useful Improvement in Axle-Clip Yokes; and I do hereby declare that the following is a full, clear, and exact description thereof, reference being had to the accompanying drawings making part of this specification, in which—

Figure 1:
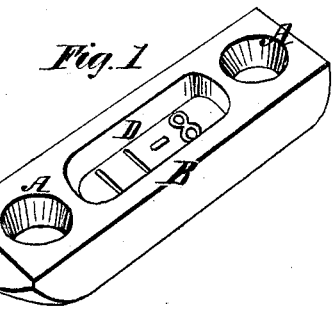
Figure 2:
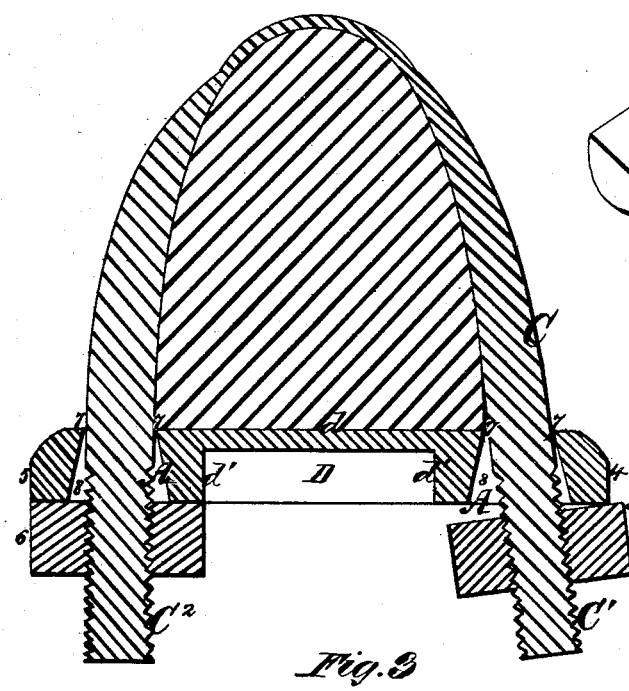
Figure 4:
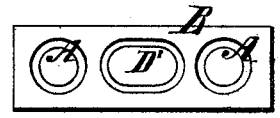
Figure 5:
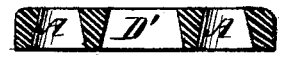
Figure 3:
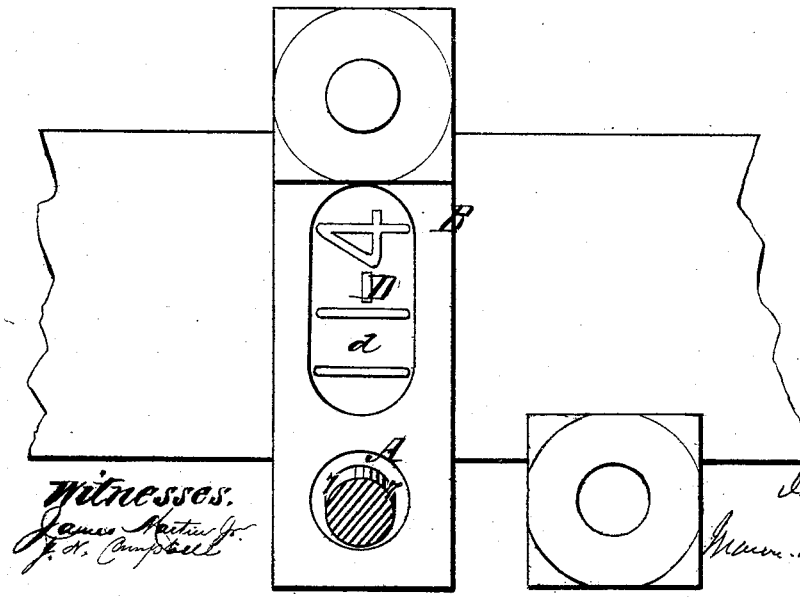

Figure 1 is a perspective view of my improved axle-clip yoke inverted. Fig. 2 is a vertical cross-section of an axle with a clip and yoke applied to it. This view shows my improved yoke in longitudinal section, and illustrates clearly the features of invention which I have made. Fig. 3 is an inverted view of Fig. 2, one of the nuts being taken off and placed to one side. Figs. 4 and 5 show an inverted plan and a vertical section of the yoke slightly modified.

The object of my invention is, first, to insure a tight and perfect fit of the nuts of the clip against the bottom of the yoke, and at the same time have their outer sides in a true line with the ends of the yoke; second, to prevent the dirt falling into the bolt-holes of the clip; and, third, make the yoke light, and still have it strong and durable.

To accomplish the first and second of these objects, I have made the bolt-holes A of the yoke B with a flaring form, the flare being from the top down to the bottom. The diameters of these holes, at their upper termini, are just about equal to the diameters of the bolts formed on the clip C, and a snug fit between these bolts and the top margin of the holes in the yoke is thereby secured, when the clip-bolts $C^1$ $C^2$ are passed through the holes A, while the bolts all below these points of snug contact are free to move laterally in the flaring holes, as is evident from the drawings. By making the snug fit at 7, dirt is prevented from getting down upon the nut and screw of the clip-bolts at that point; and by flaring the holes below that point, as at 8, the nut can be screwed up tight against the bottom of the yoke, and then, if the vertical axis of the bolts of the clip is not central with the hole in which it is fitted, the nut can be driven (with a hammer) over laterally with the bolt, until the edge 3 of the nut is in a true line with the edge 4 of the yoke, in the manner shown on the opposite side at 5 and 6. At 5 and 6 the center of the bolt is in line with the center of the hole in the yoke and nut, and the outer ends of the yoke and nut are in line. At 3 and 4 the axis of the bolt of the clip is sprung out of line with the axis of the hole in the yoke, and the nut consequently does not bear squarely against the bottom of the yoke; and, therefore, when this nut is screwed up tight, its outer end will be out of line with the outer end of the yoke, but by giving the nut one or two blows with a hammer, it will move laterally toward the center of the clip, for the bolt is free to bend at 7, and the portion below this point free to move at 8, in the flaring hole of the yoke. This done the nut may be screwed up tighter, if necessary, and when this is done it will be found that all the lines coincide in the manner shown on the opposite side of the clip at 5 and 6. This is an important feature in this small article, inasmuch as the tasteful finish of a fine carriage at these points cannot be effected if the nuts, clips, and yokes do not stand in the relation to one another shown at 5 and 6; besides this it is not possible to get a square hold of the nut against the bottom of the yoke, if the bolts of the clips are not equidistant from the vertical axis of the bow of the clip, and the nuts are, therefore, liable to soon work loose.

If my improvement was not provided, and the parts stood as at 7 and 8, it would be necessary, after screwing up the nut tight, to file off the nut to make the appearance shown at 5 and 6. This is a very expensive operation compared with the simple operation of knocking over the nut with the bolt, in the manner described.

To effect the third object of my invention, I form on the under side of the yoke, between the holes A, an oblong recess or chamber, D. This chamber is so made that it is bound at the top by a horizontal web, $d$, and on the sides and ends by vertical ribs $d'$ $d'$. This gives a tasteful appearance, and great strength with reduced weight of metal. The horizontal web serves also as a base upon which to mark the size of yoke—a thing very necessary in the trade. My plan of reducing weight of metal avoids weakening the yoke, for it will be observed that I retain the full width of the piece of metal, and reduce between the sides and ends of the yoke.

In the manufacture of carriage hardware, the saving of the smallest amount of metal in the smallest articles has become a matter of importance, and where this can be accomplished without sacrificing strength it is done. Carriage hardware must be tasteful, perfect in its fit, and light and strong, all of which requirements my invention complies with.

The yokes are made of malleable cast-iron, which renders them very durable.

In Figs. 4 and 5 the flaring-holes are formed on each side of an oblong central passage, D', made entirely through the yoke for the purpose of reducing the weight of metal. This plan, considering the saving of metal, is much stronger than the ordinary yokes, which are hollowed out on their side edges; but it is not as good nor as durable as my other plan, shown in Figs. 1, 2, and 3. I, however, desire to be protected in both plans, inasmuch as both accomplish the three objects named—to wit, saving of metal without sacrificing strength, making a tight and neat fit between the nuts and yoke, and preventing dirt getting down into the bolt-holes.

What I claim as my invention, and desire to secure by Letters Patent, is—

1. The clip-yoke B with the bolt-holes A therein, flaring toward the under side of the yoke, substantially as and for the purpose described.

2. The clip-yoke B, having a depression between the bolt-holes, as and for the purpose set forth.

3. The combination of the clip C with the yoke B, whereby the bolts of the clip fit snugly in the holes of the yoke at 7, and are free to move laterally in said holes at 8, or below the point 7, substantially as described.

JAMES IVES.

Witnesses:
MARY A. IVES,
MARY L. GOODYEAR.